United States Patent [19]

Timmons

[11] E Patent Number: Re. 33,600

[45] Reissued Date of Patent: Jun. 4, 1991

[54] ENVIRONMENTAL CONTROL SYSTEM FOR POULTRY HOUSES

[75] Inventor: Michael B. Timmons, Ithaca, N.Y.

[73] Assignee: Cornell Research Foundation, Inc., Ithaca, N.Y.

[21] Appl. No.: 427,259

[22] Filed: Oct. 12, 1989

Related U.S. Patent Documents

Reissue of:

[64] Patent No.: 4,700,887
Issued: Oct. 20, 1987
Appl. No.: 947,338
Filed: Dec. 29, 1986

[51] Int. Cl.[5] ..... F24F 7/00; G05D 21/00

[52] U.S. Cl. ..... 236/49.3; 236/44 C; 236/91 C; 119/31; 237/3

[58] Field of Search ..... 236/49.3, 94, 44 R, 236/44 A, 44 C, 44 E, 91 A, 91 C, 6; 237/3; 165/16; 119/31, 32, 33, 34, 17, 21

[56] References Cited

U.S. PATENT DOCUMENTS

| | | | |
|---|---|---|---|
| Re. 30,485 | 1/1981 | Attridge, Jr. et al. | 236/44 C |
| 1,129,549 | 2/1915 | Carrier | 236/44 C |
| 2,257,485 | 9/1941 | Sewell | 236/44 |
| 2,538,192 | 1/1951 | Fantini | 200/52 |
| 3,181,791 | 5/1965 | Axelrod | 236/44 |
| 3,329,341 | 7/1967 | Jones | 236/46 |
| 3,601,096 | 8/1971 | Rutherford | 119/15 |
| 3,867,903 | 9/1975 | Fleshman . | |
| 3,892,201 | 7/1975 | Crawford | 119/17 |
| 3,915,377 | 10/1975 | Sutton, Jr. | 236/49 |
| 3,951,336 | 4/1976 | Miller et al. | 236/49 X |
| 4,107,268 | 1/1978 | O'Neill et al. . | |
| 4,239,020 | 11/1980 | Kiyokawa et al. . | |
| 4,241,871 | 12/1980 | Newell, III et al. | 236/49 |
| 4,281,789 | 8/1981 | Quinlisk | 236/49 X |
| 4,369,030 | 1/1983 | Siccardi | 236/49 X |
| 4,430,828 | 2/1984 | Oglevee et al. | 47/17 |
| 4,524,722 | 6/1985 | Siccardi | 119/21 |
| 4,535,601 | 8/1985 | Newell, Jr. et al. | 62/171 |
| 4,540,118 | 9/1985 | Lortie et al. | 236/44 C |
| 4,572,427 | 2/1986 | Selfridge et al. | 236/3 |
| 4,602,739 | 7/1986 | Sutton, Jr. | 236/49 X |

FOREIGN PATENT DOCUMENTS

| | | | |
|---|---|---|---|
| 2125191 | 2/1984 | United Kingdom | 237/3 |

OTHER PUBLICATIONS

"Use of Low-Cost Microcomputers to Control Poultry House Heating, Ventilation and Lighting" by T. N. Reece & B. D. Lott from Poultry Sci. Abstracts (1983).

"Housing, Ventilation, Temperature as They Relate to Broiler Performance" James W. Deaton from Poultry Digest, Nov. 1983.

*Primary Examiner*—Harry B. Tanner

*Attorney, Agent, or Firm*—Jones, Tullar & Cooper

[57] ABSTRACT

Method and apparatus for controlling environmental conditions in an animal house, and particularly in a poultry house, for producing maximum economic return. The static parameters of the house are determined, and thereafter continuous measurements are made of current inside and outside temperatures. The operator makes periodic assessments of litter condition in the house, and adjusts the target 24-hour average relative humidity to produce the desired litter condition. The system controls the heating and ventilation system to obtain the desired 24-hour average relative humidity while maintaining the optimum temperature conditions in the house for maximum economic return.

13 Claims, 7 Drawing Sheets

ENVIRONMENTAL CONTROL SYSTEM FOR POULTRY HOUSES

Matter enclosed in heavy brackets [ ] appears in the original patent but forms no part of this reissue specification; matter printed in italics indicates the additions made by reissue.

BACKGROUND OF THE INVENTION

The present invention relates, in general, to control systems for regulating the environment within animal growth houses, and in particular to the control of humidity and temperature within poultry houses for economic optimization of broiler chicken production.

The production of broilers in the poultry industry involves a "grow out" stage in which many thousands of young chicks are delivered to a poultry house, where they are sheltered and provided with food and water through a growth cycle of about six to eight weeks. At present, about 5 billion birds are produced per year. The chicks are not individually caged, but are massed in the poultry house by the thousands. A typical poultry house is a steel-truss or wood frame structure with seven foot high walls, a width of 40 to 50 feet, and a length of 300 to 600 feet. One or two curtain dividers, or partitions, are usually provided along the length of the house to divide the building into sections to restrict the access of the birds since very young chicks do not require the entire floor space. In addition, the building may be provided with large openings along its length for natural ventilation, the opening being provided with curtains to control air inflow and to maintain heat in the winter. Alternately, the building may be totally enclosed, and dependent on mechanical ventilation for substantially all air exchange, in which case fans may be located at spaced positions along the length of the house. A plurality of heaters are normally provided for maintaining the temperature at a desired level. The heaters may be spaced along the length of one wall, preferably the wall opposite the fan location. Cooling is not usually provided.

One section of the house is used as a brooder portion, and incorporates either large brooder stoves within the house or external heaters. Both are capable of maintaining a relatively high temperature in the brooder section. An automatic feed system supplies specified quantities of feed to the birds, and an automatic watering system provides a regulated quantity of water to the poultry house.

For the first three weeks of life, chicks are not able to control their own body temperature, and thus are very susceptible to changes in temperature within the poultry house. For this reason, the brooder stoves or heaters in the brooding section are capable of maintaining the temperature level constantly high, in the range of 85°-95° F. When the chicks are small, most of the poultry house can be closed off by the partitions, so that only a small area, for example 25% of the total area, need be maintained at this high temperature. However, after about 20 or 21 days, the chicks begin to be able to regulate their own body temperature, and the brooder section does not have to be maintained at this high level. In many systems, the brooder stoves are simply turned off at this time, and the temperature level within the house is maintained by the body heat of the birds themselves. Occasionally, supplemental heat must be added during cooler weather, and during warmer weather the houses must be well ventilated to prevent overheating, for chickens are susceptible to temperatures that are too high. After about the 21st day one or both of the divider partitions may be removed to allow access to the entire building. The period prior to this time is usually referred to as the brooding period; the following time is usually referred to as the growout period.

In a poultry house, the entire floor normally is covered with a "litter" material, usually wood shavings, which remains in place for about a year before it is changed. During that time, the litter accumulates a great deal of fecal matter, water, spilled feed, and the like, so that its nature and consistency gradually changes over that period of time. The condition of the litter directly affects the quality of the air in the poultry house, and to a large extent determines the air quality. Accordingly, bird health and performance are directly related to the moisture level of the litter in the house.

Chickens are extremely sensitive to dust, and if the litter becomes too dry, respiratory problems such as bird air saculitis can affect an entire flock. On the other hand, if the litter remains too moist, it encourages the growth of harmful bacteria, incubating diseases such as coccidiosis which is one of the most devastating of the poultry diseases, and which can infect an entire flock. The danger of such infection requires that medication (coccidiostats) be added to the feed, in present poultry houses, and this medication is very expensive. Thus, it is critical for the health of the flock, and for the economic operation of the poultry house, to maintain the moisture level in the litter at a healthful level.

Since there is a continuous air flow through poultry houses, the relative humidity level in the air is changeable, and depends to a large extent on the temperatures inside and outside the house, but also depends on the moisture level in the litter. An important factor in determining the moisture level in the litter is the relative humidity of the air, for the litter acts as a sponge to absorb moisture from the air or to give moisture up to the air, depending on their relative moisture conditions. Although short-term variations in the air relative humidity may be produced by controlling the air flow through the house, the long-term moisture level in the poultry house litter changes relatively slowly, so that changes in ventilation rates do not immediately result in corresponding changes in litter condition. Instead, litter changes occur over a several hour period.

Another factor affecting air quality in a poultry house is the amount of ammonia produced by the litter. This varies with the condition of the litter, and other factors, but must be taken into account when controlling ventilation rates, for if the ammonia level is too high, ventilation must be increased, even if it is at the expense of desired humidity and temperature levels.

In prior control systems for poultry houses, it was recognized that the humidity level and the air temperature were important for maintaining the health of a flock. However, the prior art did not fully comprehend the nature of the interaction between the heating system, the humidity levels, and the operation of the ventilating system and thus did not attempt to control them in such a way as to maintain optimum conditions wherein the health of the poultry is safeguarded, while at the same time, holding the energy and other costs required to a minimum. For example, attempts to control the temperature within a poultry house can adversely affect the control of humidity, for the addition of heat to raise the air temperature increases the moisture capacity of the air and tends to dry out the litter. Similarly, increasing temperatures in warm weather of unacceptable high ammonia levels can result in the operation of ventilating fans, increasing the air flow and thereby drying out the litter. Thus, the requirements for heating or ventilation may conflict with the humidity level requirements within the poultry house. These conflicting requirements make environmental control very complex, and have precluded the effective control of litter moisture on a continuous basis. Further, prior systems have not provided a mechanism for obtaining environmental control in such a way as to provide a maximum economical return from the poultry house.

The operation of various heaters and ventilators in poultry houses was, in the past, controlled manually by an operator who made periodic measurements or subjective assessments of litter moisture level and interior temperature levels, with the operator being required to then experiment with the heating and ventilation controls in an attempt to regulate the air quality on the basis of those measurements or assessments. Since the relationships are complex, and since the operator would only make periodic measurements and adjustments, such manual systems led to wide, and often harmful, fluctuations in temperature and humidity, and presented an almost insurmountable problem even to experienced operators, particularly during periods of extremely variable weather, as often occurs in the spring and the fall. This difficulty was compounded by the fact that accurate measurements of litter moisture are extremely difficult to make, not only because the conditions of the litter can vary widely over the length and width of a poultry house, but because the measurements provided by a limited number of available sensors will only provide an indication of surface condition for a very small area, rather than the actual condition of the litter as a whole. Thus, the use of such sensors would often cause the operator to make control determinations on the basis of inaccurate or incomplete data, thereby causing incorrect operation of ventilating fans or heaters. In addition, such sensors have the further disadvantage of being quite costly.

More recently, attempts have been made to provide computerized control of the poultry house environment, and extremely complex control systems have been developed which attempt to take into account all of the large number of variable conditions. However, in reality such computerized systems essentially replicate the manual control of a poultry environment, and for this reason have not been satisfactory. A common feature of all such prior control systems is that they operate on the basis of preselected criteria, such as charts which provide specified values of air temperature and relative humidity, and operate to those preselected values only. Such systems cannot take into account the dynamic changes that occur within a poultry house from day to day and are even less able to take into account changes from hour to hour. These dynamic changes include changes in litter type, variations in litter conditions from the time of bird placement, changes in the birds themselves both as to size and as to health, changes in feeding patterns in response to air temperature, and changes in factors such as outside air temperature and humidity. These prior art systems do not provide for qualitative, continuous assessments of existing inside and outside conditions, but simply operate in accordance with preselected values.

It is essential that a poultry house be operated for maximum economic return. The two principal factors in an economical operation are: (1) the cost of maintaining the poultry house environment and the associated bird performance, including the rate of growth and feed consumption, all of which are extremely temperature dependent; and (2) bird health. Optimal environment control must be directed to both aspects. Systems which operate to preselected conditions of air temperature and humidity cannot operate economically at all times, but instead depend upon whether the preselected values happen to be best for the particular poultry house at the particular time, under the particular weather and animal conditions. Sometimes the preselected values are correct; most of the time they are wrong. Various studies have shown that optimal economic conditions are dynamic and are house specific, and cannot be specified by a fixed general management method. Yet the existing systems are so complex, in attempting to incorporate all of the various factors involved in environmental control, that an operator can do little to correct the situation or compensate for errors which produce an uneconomic operation.

SUMMARY OF THE INVENTION

It is, therefore, an object of the present invention to provide a simplified system for control of the environment within an animal enclosure such as a poultry house.

It is a further object of the present invention to provide a system for automatic control of the environment within a poultry house in order to protect and enhance economic return.

It is a further object of the present invention to provide a simplified system for automatic control of the environment within an animal house and which is responsive to qualitative inputs to adjust the system for the most economic operation under changing conditions.

The present invention overcomes the complexities of prior art environmental control systems and provides a system which produces optimal economic return from the operation of a poultry house. The invention is a simplified, dynamic system which responds not only to fixed data such as the poultry house structural and mechanical configuration, but to variable data such as the prices of fuel, feed, and electricity, overhead and labor costs, and data from temperature sensors. Most importantly, the system also responds to dynamically changing data, which is supplied to the system by way of a single input to allow the operator to provide a continuing, qualitative control of the operation of the entire system.

The present system is simple to install, since it requires only a minimum number of temperature sensors, and once fixed mechanical data relating to static parameters of the particular poultry house are entered into the control system, is simple to operate and is highly responsive to control by the poultry house manager. The system can be easily updated by the operator, or manager, for optimum operation by entering into the control system current economic information relating to the cost of fuel, feed and electricity, the market value of the poultry at the end of the grow out period (unit price per pound), the number of birds being processed, their current weight, and the like. These variable input data and the temperature inputs are used by the control system in determining the temperature most to produce maximum net return for the system. Finally, the operator can periodically inspect the condition of the poultry house to assess the condition of the litter, which continually changes, to provide a humidity control input, which establishes an average daily target air relative humidity within the house which will cause the litter to dry out, if it is observed to be too wet, or will cause the litter to absorb moisture, if it is too dry. The control system then operates the various fans and heaters in the building to control the building environment and to produce the temperature which will provide the desired litter condition to protect bird health and obtain optimum economic return. This operation is under the supervision and control of the building manager or operator, thereby giving the operator an important function in the overall success of the poultry house management.

The present control system calculates two different ventilation rates based on the fixed, variable, and dynamic data provided. One rate (VH) determines the ventilation flow required to remove moisture and thereafter to maintain a desired level of humidity in the air within the poultry house. The other rate (VT) determines the ventilation flow required to maintain a desired temperature. The control system then operates to provide the maximum ventilation, as determined by the largest of VH or VT, by turning on the number of ventilating fans and heaters required to produce an air temperature which will, over a period of time, produce and maintain the desired moisture level in the litter.

The key to the present system is the fact that it does not rely on sensors for measuring litter moisture, and does not attempt to maintain the humidity in the atmosphere within the poultry house at some arbitrary, preselected value. Instead, the present system is based on the recognition that the air relative humidity directly influences the litter condition, and that changes in litter moisture occur relatively slowly. Because litter moisture and air relative humidity are critical to the health and growth of the birds, the system provides for an ongoing, active participation by the operator, who periodically, as on a daily basis, assesses the dynamically changing condition of the litter in the poultry house and adjusts the operation of the system in accordance with his judgement as to the quality of the litter. If the operator judges the litter to be too wet, he simply adjusts the present system to decrease the air relative humidity; similarly, if he judges the litter to be too dry, he adjusts the system to increase the relative humidity. This simple adjustment varies the operating point of the automatic control system, which then functions at the new target humidity conditions established by the operator to balance the heating and ventilating of the poultry house for maximum economy at this new setting. As a result, no humidity sensors in the litter are required and a dynamic input to the system is provided to enable the operator of the poultry house to maximize the operation of the system for current conditions.

The air target humidity value set by the operator is a 24-hour average value, so it only needs to be adjusted once a day, if at all. Since the litter acts as a damper to any changes in relative humidity in the air within the poultry house, the litter condition will lag behind changes in the air relative humidity. Thus, if the average air humidity for the immediately previous 24 hours is lower than the air target value established by the operator, then air flow through the poultry house is controlled by the ventilating fans to increase the air relative humidity, while if the 24-hour average is higher than the target value, the ventilation is controlled to reduce the air relative humidity. The ventilation rate is continuously adjusted to maintain the air relative humidity at the target value, thereby gradually changing the litter moisture level. As noted above, the ventilation rate is controlled by the largest of VH or VT.

When the running average air relative humidity (RH) is below the target air RH, the ventilation rate for moisture VH is calculated using an air relative humidity value of 90 or 95% as the basis for control. When the ventilation requirements for humidity VH exceed the ventilation requirements for temperature VT, then VH controls, and the running average air relative humidity will increase, since the control relative humidity will be near saturation (90-95% RH). However, high air relative humidity increases the likelihood that VT will exceed VH, and as long as the ventilation required for temperature control (VT) exceeds the ventilation required for humidity control (VH), the running average for the air relative humidity will decline. When the air temperature in the house drops, as would normally occur at night, the ventilation required for temperature control will be reduced, usually to a level where VH exceeds VT. Then the VH requirements will control, and the 24-hour running average air relative humidity will increase. VH requirements will be based on a 90 or 95% relative humidity until the 24-hour average RH reaches the operator selected target value. At this point, VH requirements are calculated on the basis of the target RH, instead of a saturation value, and since the target RH and the 24-hour running RH are the same, the desired value will be maintained. This operation is the key to maintaining a high quality air environment in the poultry house. After determining the required ventilation rate for either temperature or humidity control, the system of the present invention activates a sufficient number of the ventilating fans to obtain the desired air flow.

A feature of the present system is that the measurement of the exterior temperature, together with an estimate of the dew point temperature, makes it possible to predict with considerable accuracy what the ventilation rate should be in order to maintain a selected temperature within the poultry house over a selected control period of time. This temperature may be optimized or operator selected. By monitoring the actual change in interior temperature during operation of the system and comparing it to the temperature change that is predicted for a given ventilation rate, the system is able to determine whether the selected fans should be adjusted to compensate for changes in ambient conditions such as changes in wind direction or velocity. Further, such a deviation from predicted temperature can indicate mechanical deterioration in the fans. In addition alarm indicators can be provided to indicate problems such as broken or slipping drive belts in individual fans.

It should be noted that the infiltration of air into the poultry house is considered to be the first "ventilation fan", and the air flow caused by such infiltration can be determined without wind sensors, simply by measuring the interior and exterior temperatures, as described above. Infiltration, which may be controlled by shutter or curtain positions, is unpredictable, because it depends upon wind direction as well as wind velocity. Prior systems required complex measurements to determine infiltration rates, as opposed to the present invention which simply uses the differences between predicted and actual interior temperatures to determine this value.

This infiltration flow rate is then used in the calculations required for determining the total ventilation flow rates, thereby providing a more accurate and less complicated system than was previously available.

In summary, the present invention provides a method and apparatus for controlling environmental conditions in a poultry house to provide maximum economic return. The method includes determining the static parameters of the poultry house, including house dimensions, thermal characteristics and other parameters relating to the economics of operating the building. A determination is then made of the number of birds to be placed in the poultry house and the portion of the poultry house which is to be used. Continuous measurements are made of the current outside and inside temperatures, and periodic assessments are made of the relative litter moisture, as to whether it is too dry or too wet. This qualitative assessment is made by an operator, who then decides whether the relative humidity of the atmosphere within the poultry house should be increased or decreased, and adjusts the target 24-hour running average for relative humidity of the air, accordingly. The system then makes a quantitative determination of the ventilation and heating requirements at all feasible inside temperatures. For example, if the temperature outside the house is 90°, an inside temperature of 80° is not feasible, since there is no cooling provided in the poultry house. Furthermore, since the brooding temperature is selected for the first 21 days of a grow out period, the temperature selected by the operator is the only feasible temperature during this time. The system determines the ventilation and heating requirements for the target relative humidity established by the operator at each feasible, or achievable, temperature, for example in one degree increments, and further determines a predicted bird growth rate and feed requirement at each feasible temperature. After completion of these calculations, the system then selects from the feasible temperature values the value which is predicted to produce a maximum net return to the operator for the next control interval. This maximum net return is the value of the meat produced, less feed costs, and less fuel and other operating costs. The system then operates the heaters and the ventilating fans in such a way as to obtain the selected optimum economic temperature at the target humidity established by the operator. This will produce a relative humidity in the building which will regulate the litter moisture and will, at the same time, maximize the economic return from the operation of the building, taking into account not only the health and growth of the birds, but the use of fuel, feed, and the like. Thus, the present system operates to optimize economic return while at the same time providing an environment which will protect and enhance bird health.

BRIEF DESCRIPTION OF THE DRAWINGS

The foregoing and additional objects, features and advantages of the present invention will become apparent from the following detailed description thereof, taken in conjunction with the accompanying drawings in which.

DESCRIPTION OF PREFERRED EMBODIMENTS

Figure 1:
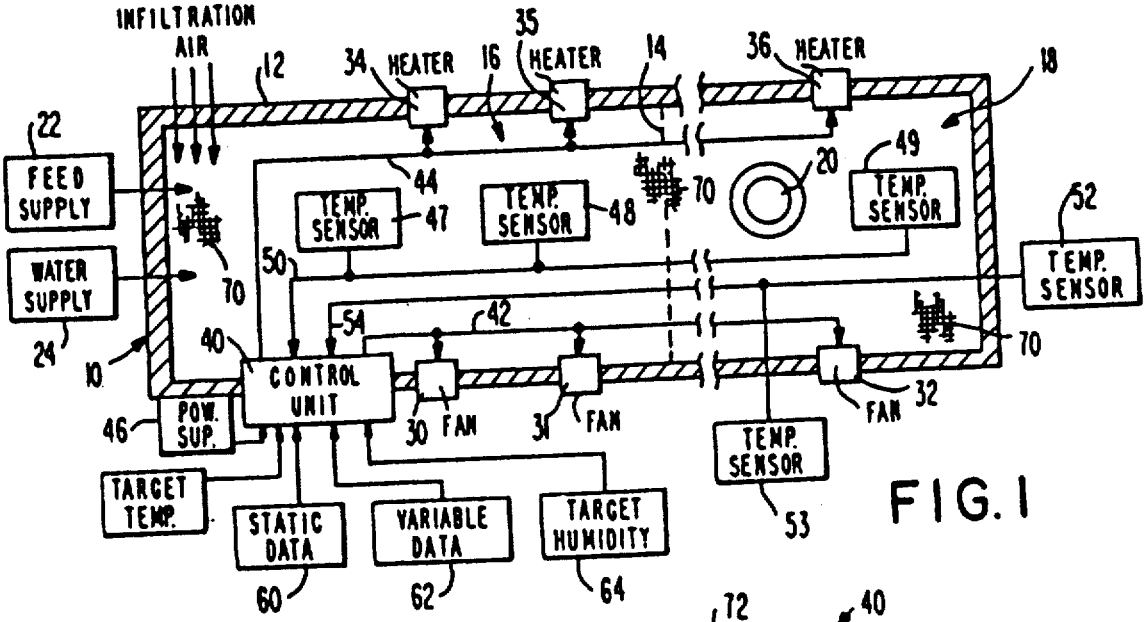
FIG. 1 is a diagrammatic outline of a conventional poultry house showing the control unit of the present invention.

Turning now to a consideration of FIG. 1, there is illustrated in top plan view the floor plan of a poultry house 10 of conventional type. As previously discussed, such a poultry house may be of any desired construction, but typically includes side walls 12 which may be about seven feet high, with appropriate insulation in the walls and roof. A plurality of windows or ventilation openings (not shown) may be provided around the perimeter of the building 10, the windows preferably being located high on the side walls and protected by overhanging eaves. The ventilation openings are either manually or automatically controlled, using shutters or curtains to control the flow of air into and out of the building.

Preferably, the building is divided into two sections by means of a moveable partition generally indicated at 14, enabling the building to be divided into sections generally indicated at 16 and 18, one of which may be designated as a brooder area such as that generally indicated at 18. The brooder area 18 is utilized during the first 20 or 21 days of the grow out period of chicks placed in the poultry house 10, and includes one or more brooder stoves 20 or other suitable heaters which are designed to maintain the temperature. Such brooder stoves are necessary only in the brooding area, which usually will be between about 25% and 50% of the floor area of the house. A conventional feed system, diagrammatically illustrated at 22, automatically controls the supply of feed to the building 10, while a watering system, diagrammatically illustrated at 24, provides water to the building in conventional manner.

In accordance with the present invention, a plurality of ventilation fans, indicated at 30, 31 and 32 are mounted in one or more side walls 12 of the building, and a plurality of heater units 34, 35 and 36 are mounted in an opposite side wall so that upon operation of the fans, any heat provided by the heaters is drawn across the width of the building to provide more uniform heating. Although only three heaters and three ventilating fans are shown, it will be understood that this is for purposes of illustrations only, and that additional heaters and fans may be provided, as required.

A control unit 40 is provided for the building, and incorporates a suitable controller, such as a microprocessor 41 (FIG. 4) which regulates the operation of the ventilating fans 30, 31 and 32 and the heater units 34, 35 and 36 by way of control cables 42 and 44, respectively. The control unit receives its operating power from a suitable power supply 46, and also receives inputs from a plurality of interior temperature sensors 47, 48 and 49 by way of cable 50 and from exterior temperature sensors 52 and 53 by way of cable 54. Preferably, the interior temperature sensors are located in corresponding partitioned segments of the building 10, while the exterior temperature sensors are located at various locations around the exterior of the building 10. Although three interior sensors and two exterior sensors are shown, it will be understood that additional sensors, or fewer sensors, may be used as required to obtain accurate average readings of interior and exterior temperature.

The control unit microprocessor 41 is adapted to regulate the operation of the fans and heaters in response not only to the interior and exterior temperature sensors, but in accordance with specific data relating to the physical characteristics of the poultry house 10, diagrammatically illustrated as static data 60, and in accordance with economic data relating to the cost of fuel, the market sale price of broiler chickens, and the like, diagrammatically illustrated at block 62 as variable data.

One of the keys to the present invention, however, is the data input to the control unit 40 provided by the input indicated at 64 as the target humidity. This data is provided by the operator or manager of the poultry house on the basis of his subjective assessment of the air quality in the house, and the condition of the litter which covers the floor of the poultry house. This litter, which is generally indicated at 70 in FIG. 1, consists of a layer of wood shavings or other similar material placed on the floor of the poultry house to protect the poultry and to absorb moisture. Typically, the litter material is replaced once a year, and during that year's time, its nature and consistency changes as spilled feed, water, fecal droppings and the like accumulate. This litter material initially may be quite dry and light, but it gradually becomes matted and saturated with other material. The quality of this litter material significantly affects the health and thus the growth of chicks in the poultry house, and accordingly its condition is a significant factor in the economic return realized from the grow out of the chicks.

The economic return is the value of the meat produced from a flock raised in the poultry house, less the associated costs of producing the meat. These costs primarily include feed and fuel, as well as electricity used for mechanical ventilation, lighting, and the like. At warmer interior temperatures, the rate of growth is lower because the birds do not eat as much, and less feed per unit of growth is required because of a lower metabolic maintenance requirement. However, more fuel is required to maintain the higher temperatures. The opposite is true at cooler interior temperatures. Thus, it is impossible to produce the biggest bird, use the least amount of feed, and use the least amount of fuel, all concurrently. The maximum economic return is a function of current costs, current meat value, the thermal characteristics of the poultry house, the current outside temperature, and the like. Whenever any of these variables changes, the optimal inside temperature for maximum economic return may also change, and the control unit 40 calculates this optimal inside temperature from the data provided by inputs 60 and 62, as well as the data from input 64.

Figure 2:
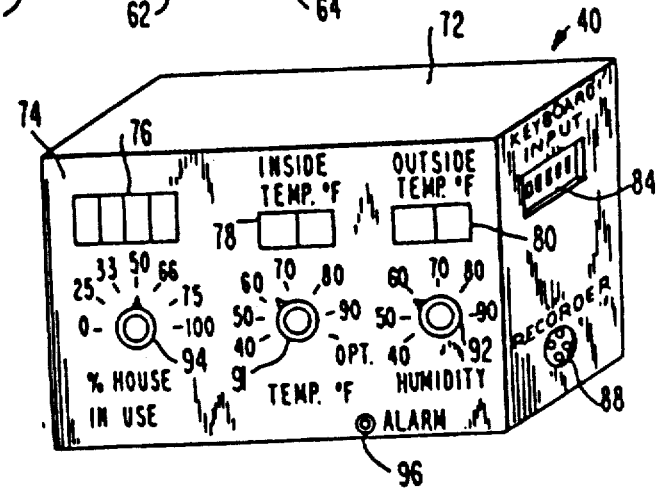
FIG. 2 is a perspective front view of a controller constructed in accordance with the present invention.
Figure 3:
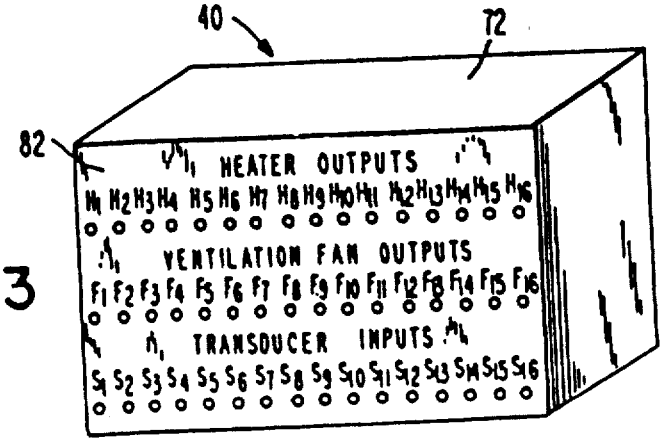
FIG. 3 is a perspective rear view of the controller of FIG. 2.
Figure 4:
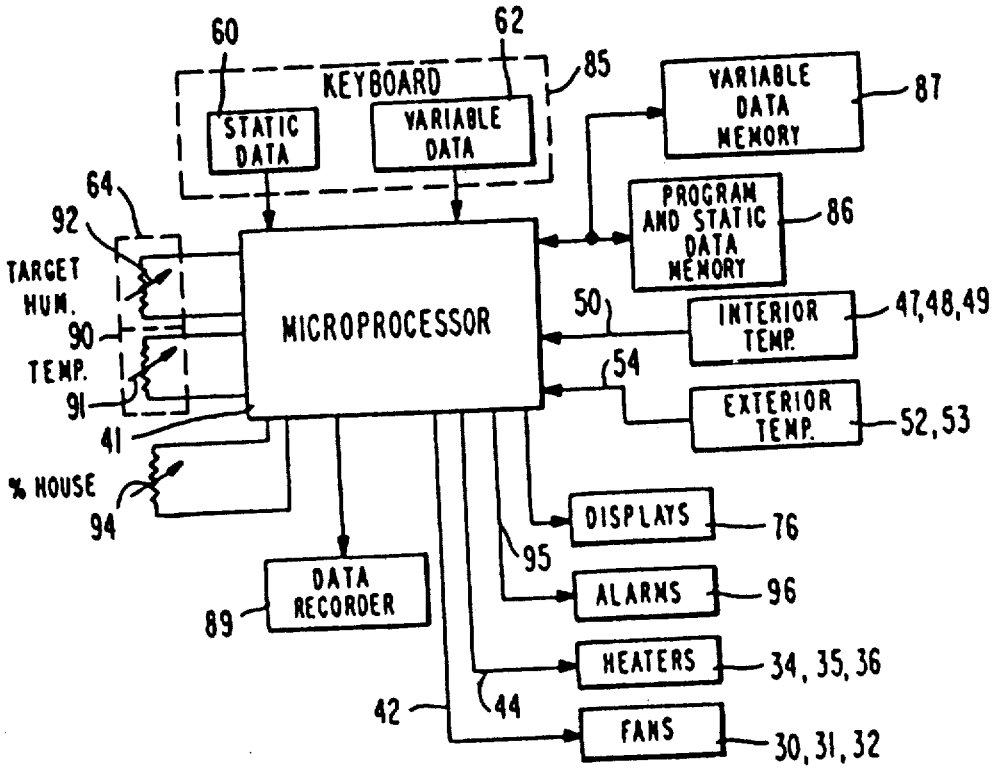
FIG. 4 is a schematic diagram of the system of the invention.

The control unit 40 is illustrated in FIGS. 2 and 3 as including a housing 72 which may enclose a dedicated microprocessor or which may simply provide connections to a conventional personal computer such as an IBM PC-XT. The housing 72 includes on its front panel 74 an alphanumeric display panel 76 which may be used, for example, for displaying data being supplied to the unit. Panel 74 also may include a display 78 for showing the temperature inside the building, and a display 80 for showing the temperature outside the building 10. These temperature displays may represent an average for the inside sensors 47, 48 and 49 and for the outside temperature sensors 52 and 53, respectively, or, if desired, selector switches may be provided to permit a display of each sensor output individually. The temperature sensors are connected by way of cables 50 and 54 to individual transducer inputs S1–S16 diagrammatically illustrated on the rear panel 82 of the control unit housing 74 (FIG. 3) for connection to corresponding inputs to the microprocessor 41 (FIG. 4). In similar manner, the heaters 34, 35 and 36 are connected by way of cable 44 to individual heater control outputs H1–H16, also diagrammatically illustrated on the rear panel 82. Finally, the ventilation fans 30, 31 and 32 are connected by way of cable 42 to the control output connections F1–F16, also on the rear panel 82. Again, the heater and ventilation control output terminals are connected to appropriate outputs on the microprocessor, whereby control signals to the heaters and fans are provided to operate these units as required, as illustrated in FIG. 4.

The control unit 40 includes an input connector 84 which permits connection of a conventional computer input keyboard, generally indicated at 85 in FIG. 4, to the microprocessor for entry of data. If desired, two different keyboards may be provided, one for the installer of the unit, who supplies static data relating to the physical characteristics of the poultry house to a static data house, who supplies to a variable data memory 87 the variable data which relates to changeable conditions, such as the economic value of the meat being produced, the cost of feed, and the like. In this way, the microprocessor 41 can be provided, upon installation, with static data which cannot be later changed by the operator or manager of the poultry house, while the variable data which must be periodically updated can be easily supplied by the operator as needed.

The static data relating to the physical characteristics of the house and the variable data relating to economic considerations may alternately be entered by means of a keyboard provided on the front panel 74 of the control unit 40; however, it is preferred that separate keyboards of separate levels of access be provided for security reasons. It will be noted that the alphanumeric read-out on display 76 provides prompts to indicate what data is being requested and will display the information entered for the user to verify. Suitable identification codes and passwords may also be provided for use in the entry of data.

An output terminal 88 may be provided for connection of a suitable recorder 89 for permanent storage of statistical information or other data, as may be required.

Apart from the variable data which may be supplied to the control unit periodically, the control unit 40 includes only three operator-adjustable inputs so that on a day-to-day basis, the operation of the system is extremely simple. First, target temperature data input 90, which is adjustable by a temperature selector dial 91 is provided to permit the operator to establish a fixed temperature selector is normally used to set a fixed temperature only during the first 20 or 21 days of the grow out period, when the birds are unable to maintain their own body temperature. During that time, the operator may adjust the interior temperature by means of the dial 91. However, at about the 20th or 21st day, the dial 91 normally is shifted to the "optimum" position, which enables the microprocessor control unit to automatically regulate the temperature in the poultry house in accordance with the requirements established by a humidity selector dial 92. This dial enables the operator to qualitatively assess the condition of the litter within the poultry house and to establish an increased or decreased target humidity level as required to return the litter to the proper condition for the health and safety of the poultry. Thus, the dial 92 permits establishment of the target humidity data provided by input 64 (FIG. 1).

A third dial 94 provides an input to the control system to indicate the percentage floor area of the poultry house currently in use, and is adjusted by the operator as the birds grow and require additional room.

Although the several selector inputs are shown as adjustable dials or potentiometers, this is for purposes of illustration only. Such inputs may be supplied to the microprocessor in any convenient way, and in particular may be supplied by means of the keyboard 85 in one preferred form of the invention.

The temperature sensors 47, 48, 49, 52 and 53 may be thermisters, thermocouples or resistive-temperature detectors. They monitor the temperature inside and outside the house 10 and are connected to the microprocessor through appropriate signal conditioning circuits (not shown) provided within the control unit 40 to produce input voltages consistent with the requirements of the microprocessor. Each temperature location preferably is monitored by two or more sensors to provide system reliability.

The dials 91 and 92 provide the operator of the poultry house with the ability to manually establish the desired inside temperature, or, in the optimizing mode, to allow the microprocessor to establish it, and further allow the operator to establish the desired (target) average relative humidity for a 24-hour period. The processor program utilizes these inputs in determining the optimal operation of the ventilators and heaters.

The outputs provided by the control unit 40 may include digital outputs on cable 95 which indicate when equipment is not operating as desired and which activate an alarm 96, and statistical data by way of output 88 on environmental conditions during the previous 24-hour period. The microprocessor may provide data on the average, maximum and minimum temperatures inside and outside the house, relative humidity, and the like, and may provide computed estimates of fuel usage. The on/off control of the heating and ventilating equipment is provided by digital outputs from the processor, with 16 outputs for each being provided, as shown on rear panel 82, to permit control of up to 16 separate pieces of heating and 16 pieces of ventilating equipment. These outputs control electromechanical or solid state relays at the heaters and ventilators to turn the equipment on or off for all or part of each control interval, such relays being conventional and not shown in the drawings. Each heater and ventilator is monitored on the basis of expected performance. If it is determined that the operation of the poultry house is not as expected, then error lights such as the alarm light 96 may be illuminated to indicate that a problem exists. If desired, a plurality of alarm lamps may be provided, one for each piece of equipment, with the appropriate lamp being illuminated to indicate the anticipated source of the problem.

The microprocessor is programmed also to provide statistical data on inside and outside temperature, average relative humidity, fuel usage, and other environmental and economic parameters upon request. Current data for the past 24 hours is available through the alphanumeric display 76 and is accessed through the keyboard. Daily statistical information as well as other performance data may be stored for an entire growing period or may be transferred periodically from the processor memory 86 to an external recording device 88 by way of terminal 87.

The control unit is battery operated to insure continuous and reliable operation, and is protected from the environment, which is dusty, moist, and contains corrosive gas. Manual overrides are provided for each heater and ventilator fan to permit manual override of the control unit.

The selection of optimum inside environmental conditions for maximizing economic return from the production of an animal such as broiler chickens in a poultry house is affected by the market value of the meat produced, the feed, fuel and electrical costs, the production costs such as labor, capital equipment, and the like, current outside weather conditions, the thermal characteristics of the building, and the age of the birds. The relationship between these factors may be expressed as follows:

$$\text{net}(T,t)/\text{time} = [\text{growth}(T,t)\cdot \$/\text{kg of meat}] - [\text{feed}(T,t)\cdot \$/\text{kg of feed}] - [\text{fuel}(T,t)\cdot \$/\text{liter of fuel}] - [\text{electric}(T,t)\cdot \$/\text{kwh}] - K \quad \text{(Eq. 1)}$$

where:

net = net return per bird, or \$/bird
T = temperature dependent variable
t = time dependent variable
time = interval over which net is optimized; may be day, minute, or hour
growth = rate of body weight gain, kg/day
\$/kg of meat = unit price of meat (live weight basis)
feed = rate of feed consumption to support growth rate, kg/day
\$/kg of feed = unit price of feed
fuel = rate of fuel use necessary to maintain house at specific temperature, liters/day
\$/liter of fuel = unit cost of fuel
electric = rate of electric use for fans and lights, kwh/day
\$/kwh = unit cost of electricity
K = amount of fixed costs per unit time and bird associated with production, including labor cost, capital cost for building and equipment, in day.

Each of the products in this equation have units of dollars per unit time per bird, and are time and temperature dependent; that is, are dependent upon the specific day, or bird age, for a specific inside air temperature. If this equation is divided by the rate of growth per bird over the time increment being used (such as the control interval of the microprocessor control) the units on each variable will be expressed as dollars per kilogram, with no time units, to thereby provide a common unit for purposes of comparison.

Figure 5A:
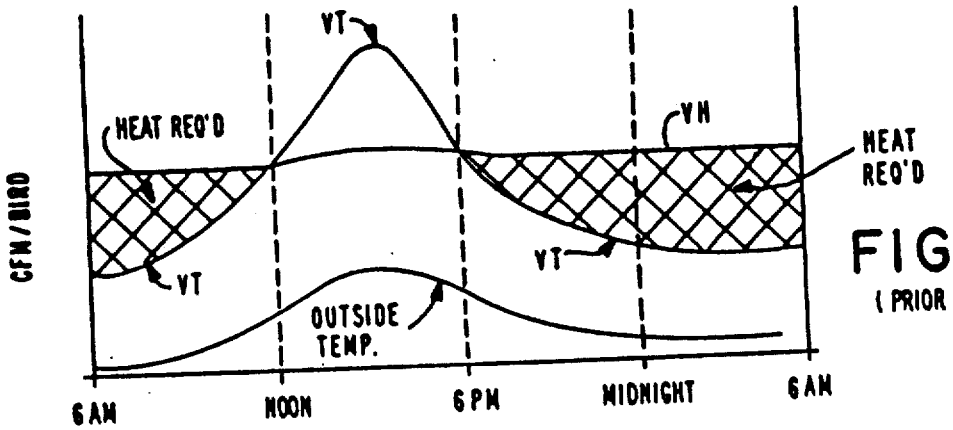
FIG. 5A (PRIOR ART)
FIGS. 5 and 5B are charts showing variations of ventilation rates over a typical 24-hour period for conventional control systems and for the present invention, respectively.
FIG. 5C shows variations in relative humidity over a 24-hour period.

Utilization of these relationships in simulations utilizing various house types, a wide range of outside temperatures, and different management schemes, clearly established that optimal conditions are dynamic and cannot be specified by any fixed management method. However, because the operation of a poultry house is extremely temperature dependent, it has been the practice in the prior art to establish rigid temperature schedules, based on operator experience to be followed during the grow out period for the birds. Accordingly, all prior systems have attempted to maintain a target average temperature for a poultry house. However, the prior systems provide no information as to how that target temperature should change with economic factors that affect economic return. As a result ventilation and heating requirements do not respond to changing conditions, with the results illustrated in FIG. 5A. As there shown, the ventilation requirements for humidity control remain relatively constant, as indicated by curve VH, instead of changing with variations in environmental conditions. As a result, excessive heating is required, as indicated in the cross-hatched areas between curves VH and VT, for heating is always required when VH exceeds VT. Furthermore, in such systems the relative humidity of the air within the poultry house can vary widely, causing serious problems if the relative humidity allows the litter to become either too wet or too dry over successive 24-hour period.

Some attempts to overcome this latter problem have led to the incorporation of humidity sensors in the poultry house in order to monitor air relative humidity or to measure the moisture content of the litter, in order to regulate the condition of the litter. However, these measurements present a serious problem, for relative humidity sensors are very expensive, and are adversely affected by the atmosphere in a poultry house, while the effective moisture level in a litter is very difficult to measure. Furthermore, if changes are made in the type of litter used, or the type of feed used, variations will occur in the litter, because different birds respond to different feeds in a different way, and thus produce different droppings, and all of these factors affect the condition of the litter. The entire problem is further affected by the ammonia content of the droppings for if the ammonia level is too high, the operator may consider it necessary to provide additional ventilation in the poultry house, even if it means reducing the moisture content of the litter. Furthermore, the overall health of the flock will also dictate the ventilation required, for if the birds have lung problems, the operator may accept a higher ammonia level in order to avoid drying out the litter and creating dust, which might adversely affect the lung problem. Thus, the arbitrary determination of temperature and humidity in prior art systems cannot provide a proper environmental control for a poultry house.

In operating the system of the present invention, the target humidity is established by a qualitative assessment of the condition of the litter and the dial 92 is adjusted to either increase or decrease its moisture level. This establishes a target relative humidity for the house. The system operates on a predetermined control cycle, or interval of, for example, five or ten minutes. At the beginning of each control interval the program calculates a rate of ventilation VT which is required to maintain the interior temperature at each of a plurality of temperature increments between the maximum and minimum values which are safe for the birds being grown out. The program also calculates for each temperature increment the ventilation rate VH needed to control the moisture level of the interior air so as to produce the 24-hour average air relative humidity selected by input 64. The calculation of VH is dependent on the outside air dew point, which is selected for this purpose as being 2° F. below the minimum measured exterior temperature over the immediately preceding 24-hour period. The microprocessor then determines which of the ventilation rates VT or VH is the larger, and operates one or more of the fans 30, 31 and 32 to provide the required ventilation of the house. This calculation is repeated at each control interval.

Figure 5B:
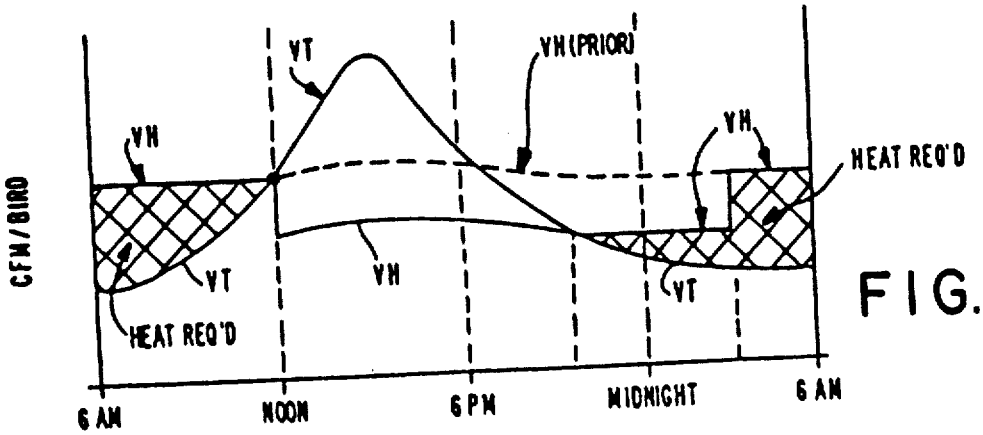

When the ventilation required for humidity control is greater than that required for temperature control (VH is greater than VT) then heat is required, as illustrated by the cross-hatched portions between curves VH and VT in FIG. 5B. If the ventilation required for temperature control (VT grater than VH), then supplemental heating is not required, since more air is flowing through the house to control temperature than is required to control humidity.

Figure 5C:
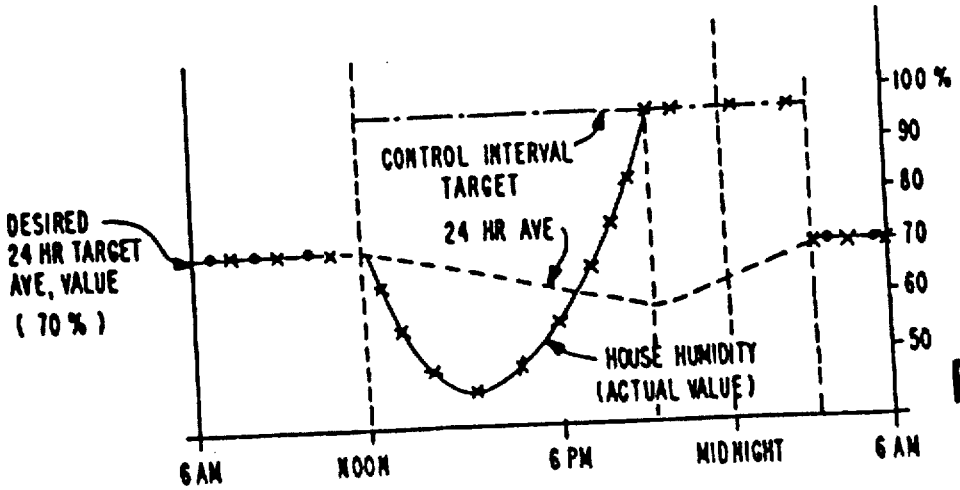

The control unit processor 41 maintains a running average of relative humidity, as shown in FIG. 5C, based upon the immediately preceding 24-hour period. This 24-hour average is calculated on a continual basis, and is used as the base for comparison with the target value established by the operator. If the target is set at 70% RH, and the current 24-hour running average is 70%, the system will maintain that relative air humidity, as long as the ventilation rate is controlled by the value VH. Thus, for example, in FIG. 5C the running average RH is shown to be 70% during the time period of 6:00 A.M. to noon, during which period VH is greater than VT (see FIG. 5B). After noon, however, the ventilation requirements for temperature control (VT) exceed VH, as is typically the case during daylight hours. When VT controls the ventilation, the actual air relative humidity within the house begins to decline (see FIG. 5C, house humidity), and as shown in FIG. 5C, the 24-hour average falls below 70%. As soon as this happens, the control target RH is set to exceed the 24-hour average by the controller establishing a high control RH of 90–95%, which will then control the calculation of VH. By using a high value for the control RH, a minimum value for VH is established, and this lengthens the time that VT remains greater than VH, as illustrated by a comparison of FIGS. 5A and 5B. By extending the time of control by VT from, for example 6:00 P.M. to about 9:00 P.M., heating is not required during that period, and heating requirements are reduced from 9:00 P.M. till 3:00 A.M. compared to those of prior art systems shown in FIG. 5A. This results in significant fuel savings, as illustrated by the reduced cross-hatched area in FIG. 5B.

As soon as ventilation control returns to the value VH; e.g. at about 9:00 P.M. in the example illustrated in FIG. 5B, the heaters are turned on, and the control relative humidity value remains at 95% until the house running average is brought back to the 24-hour average target value, e.g. 70% at about 3:00 A.M.; then the control interval target is reduced from 95% to 70% so that the 24-hour average will remain at 70% (see FIG. 5C). This not only saves fuel, but more importantly allows the litter to more quickly return to the target moisture level, and makes it more likely that the poultry house air quality will be maintained in a healthy condition. This is only made possible through the use of the optimizing control system of the present invention.

During minimal ventilation periods, as when outside temperatures are cool, infiltration of air into the poultry house can provide a significant part of the required air exchange rate. If infiltration rates are not known, or are incorrect, the result can be over or under ventilation, resulting in poor litter conditions and/or excessive fuel usage. The present invention adjusts for this by treating infiltration as a first stage of controlled ventilation. Since the infiltration rate can change due to changes in the speed or direction of the wind, this fact must be taken into account in calculating ventilation rates. Similarly, the mechanical ventilating fans deliver air flow against a pressure difference which can change as the direction and velocity of the wind changes, and this must also be taken into account by the system of the present invention. Once the required ventilation rate is established by the temperature or humidity parameters, the system of the present invention calculates how many fans are necessary and the length of time they should be on during the next control interval to provide the required flow rate. The system also determines the sequence in which the fans are selected so as to extend the life of individual fans. When a group of fans is activated, the temperature of the poultry house can quickly change, resulting in a change in the number of fans operating and producing cycling of fans on and off over successive control intervals. This is not untypical in the control of poultry houses, and can cause excessive wear in some fans. Accordingly, in the present system the fans are sequenced si that all of them go through at least one on cycle before the operation of a given fan is repeated.

Figure 6:
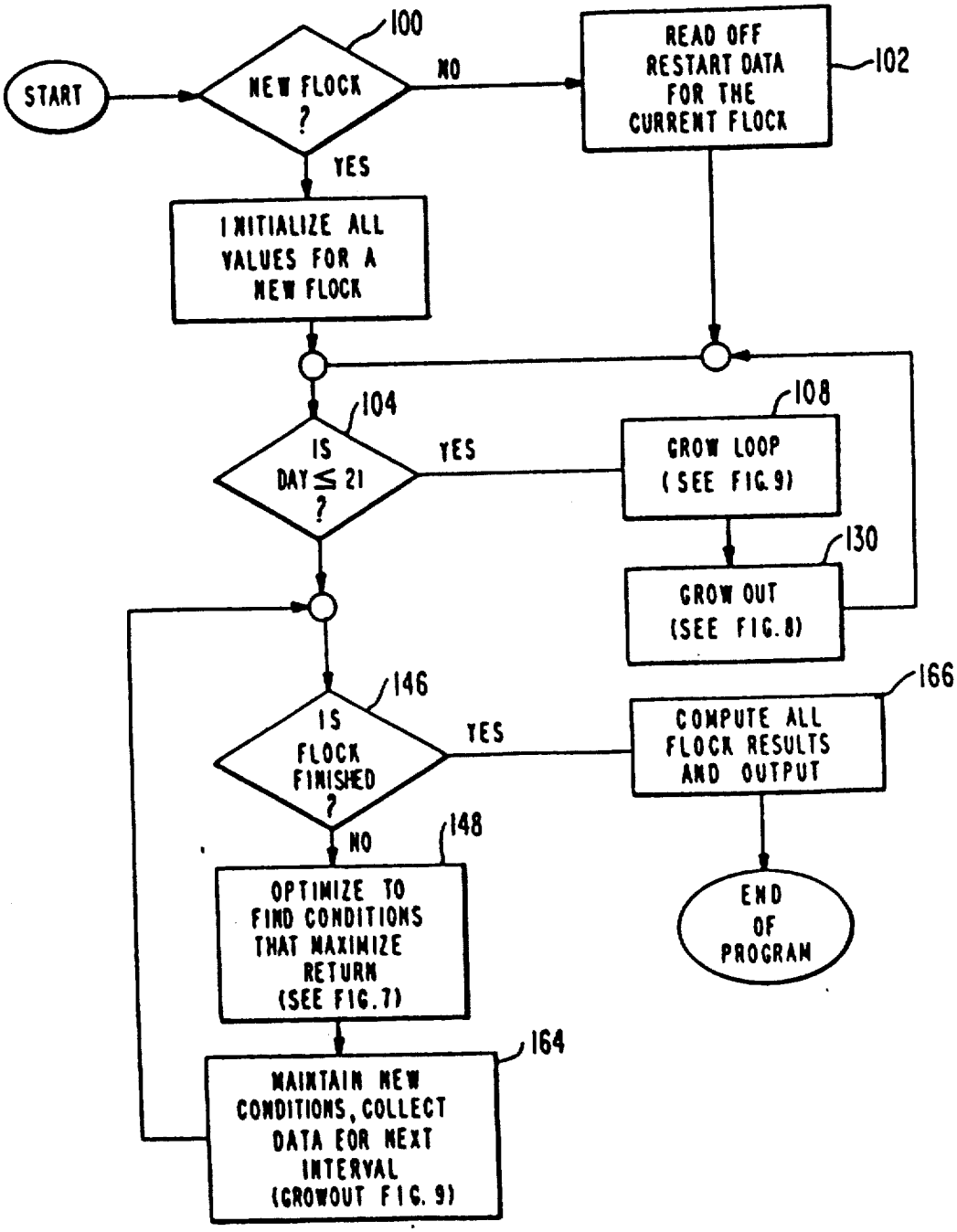
FIGS. 6–9 are flow diagrams for the control system of the invention.
Figure 7:
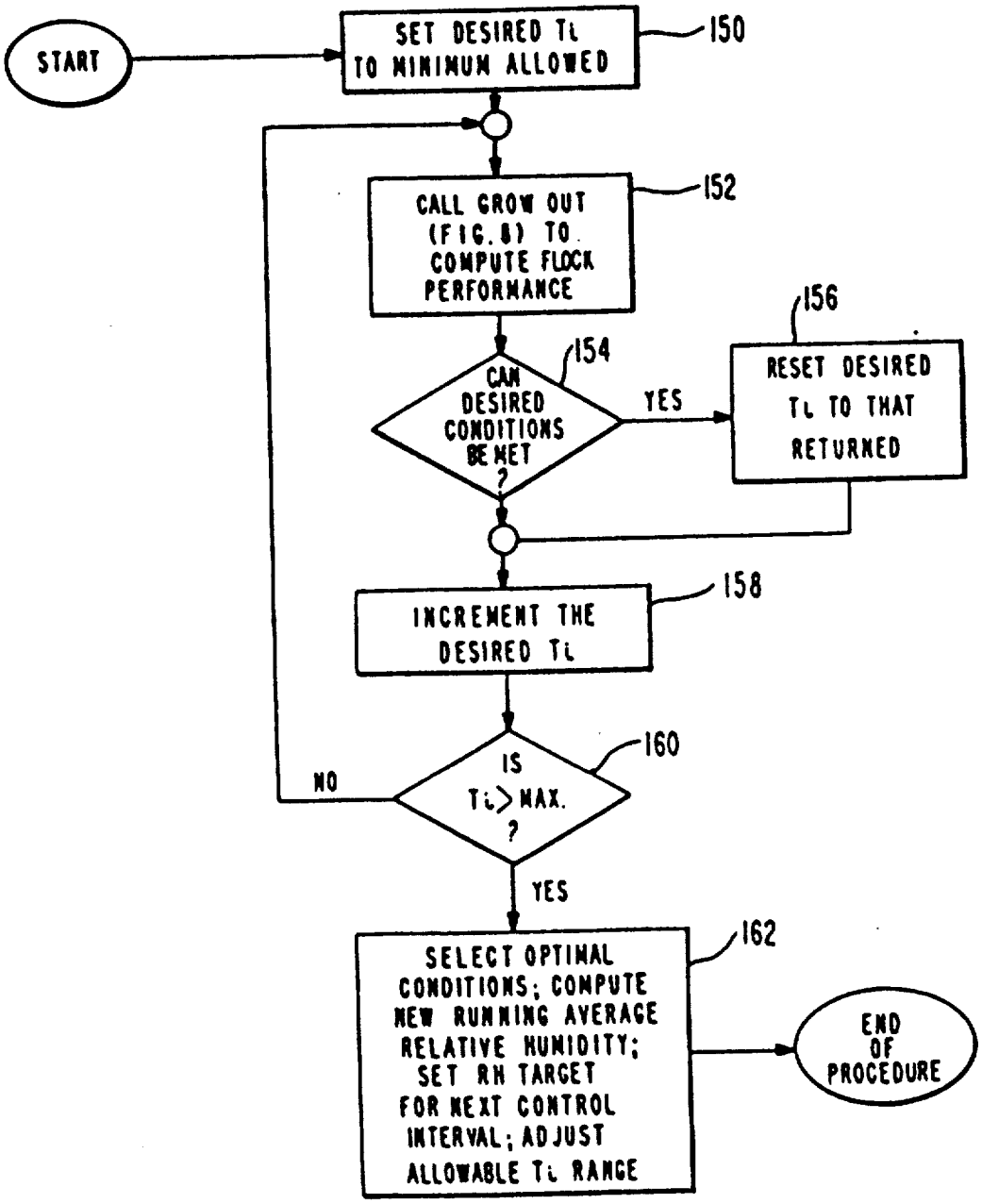
Figure 8:
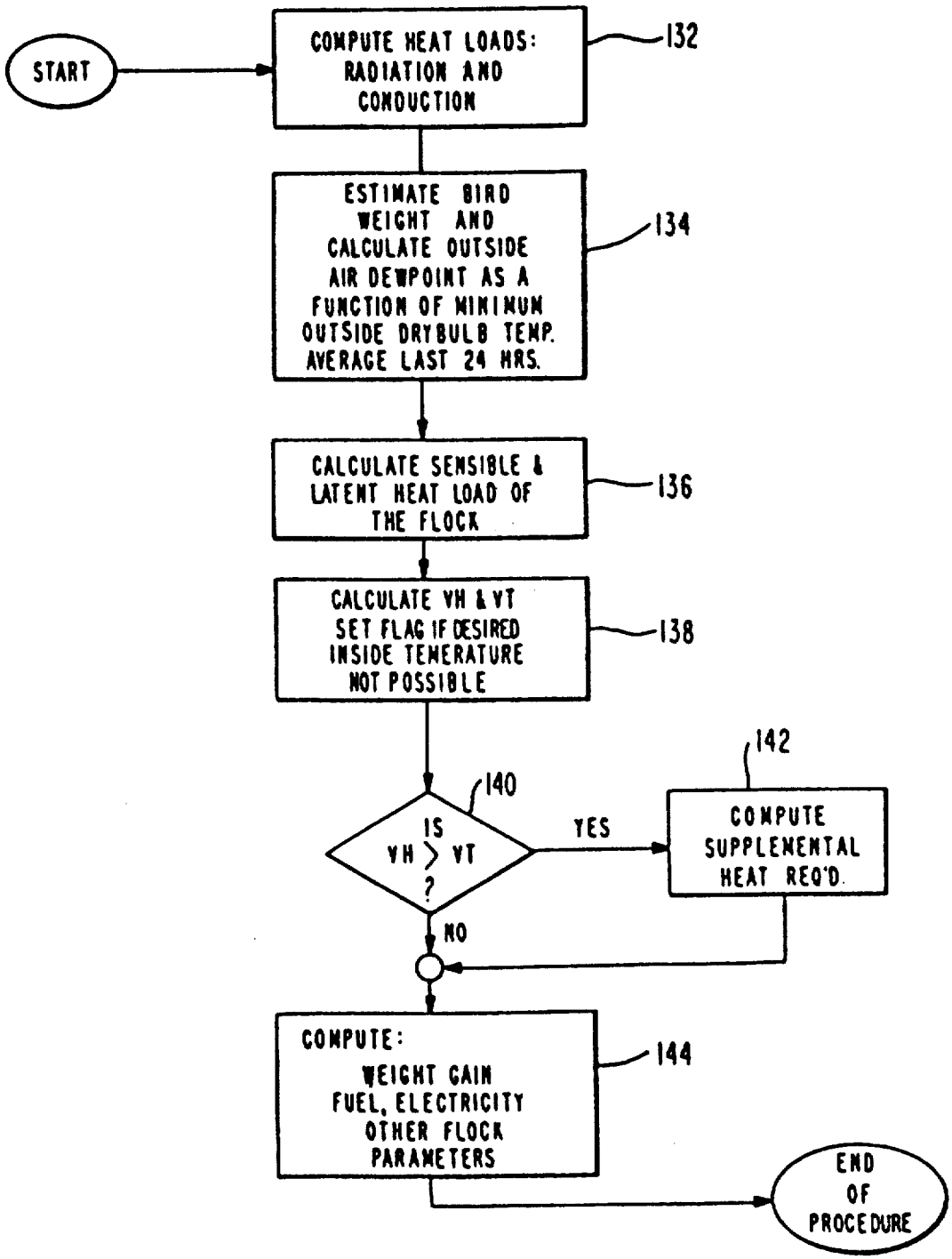
Figure 9:
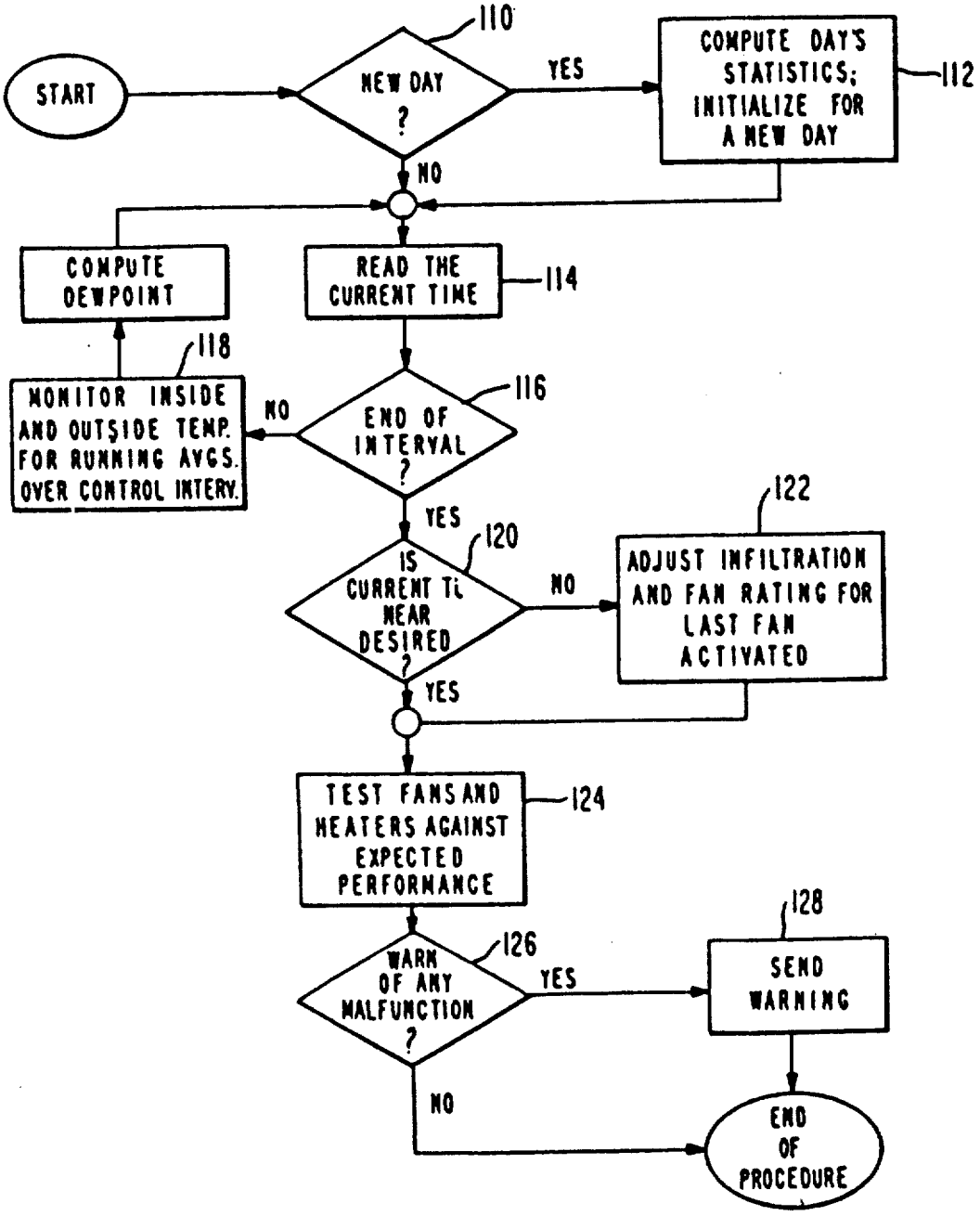

The program carried out by the control unit 40 is generally indicated in FIG. 6, with subroutines being illustrated in FIGS. 7, 8 and 9. As indicated in FIG. 6, when the program is started, an indication must be made at block 100 whether the start up is for a new flock, or for an existing flock being grown out. If it is not a new flock, then as indicated in block 102, the data concerning the flock will already be in the computer memory, so the program simply recovers that data and goes on to block 104 of the program. However, if this is the start up for a new flock of birds, then it is necessary to initialize the data in the processor memory, as indicated at block 106, by establishing the number of birds in the flock, the strain, their age, and similar data. This is part of the variable data 62 which is supplied to the system. When this is done, the program then goes on to block 104, where it is determined whether the birds are 21 days old or not. If they are less than 21 days, the program goes to the grow loop illustrated in FIG. 9, as indicated at block 108.

The program loop of FIG. 9 maintains the house at specified conditions, collects data on inside and outside temperature, and keeps a 24-hour running average of selected variables. The loop also monitors fan and sensor performance, and adjusts fan rates based on feedback information. The loop starts by determining the time of day, and if it is the beginning of a new day, the system goes through a computation of statistics for the preceding data, as illustrated in blocks 110 and 112. The program then reads the current time, at block 114, and if the time indicates that it is not the end of a predetermined control interval, such as a 10-minute interval, or any other arbitrary time period, the system continues to monitor inside and outside temperatures for determining running averages over the control interval, as indicated at blocks 116 and 118. When the end of the control interval is reached, the system proceeds to block 120, where it is determined whether the current inside temperature is at the desired value. When the chicks are less than 21 days old, the desired temperature is that which has been set, for example, by dial 91 on the control panel 74 of FIG. 2. If the temperature is not at the desired value, then the system adjusts the operation of the fans and/or heaters so as to reach the desired temperature, as indicated at block 122.

When the temperature is near the desired value, or after adjustment of the ventilating rate, the fans and heaters are tested, at block 124, against expected performance. This is done by comparing the target inside temperature with the actual inside temperature to determine whether the inside temperature is at the expected value. The target temperature is based upon the known ventilating rates for individual fans operating during the control interval, plus the expected infiltration rate, on the measured outside temperature and on the net heat balance of the house. If there has been any significant deviation from the expected performance, this is determined at block 126, and an alarm signal is established, at block 128. If there is no malfunction, or after the warning has been sent, the loop of FIG. 9 is complete, and the system returns to the program illustrated in FIG. 6, where the next step is to proceed to the grow out loop illustrated in FIG. 8, as shown at block 130 in FIG. 6.

The grow out loop of FIG. 8 provides a program for growing birds at either the selected or the optimized inside temperature, as determined by dial 91, and if VT is greater than VH, at or below a control target relative humidity, which may be at or above the target 24-hour running average humidity, and which is set by dial 92. The program computes (or predicts) rate of growth, feed consumed, electrical usage and fuel usage at the target inside temperature and selected RH, and this data is transferred to the memory for use by the main program. During the control interval, the loop first determines solar radiation, conduction, and heat loads for the ventilating system, as indicated at block 132, and provides an estimate of both dew point and current bird weight, as indicated at block 134, this estimate being based upon the age of the flock, the feed consumed, and other historical parameters. From these data, the sensible and latent heat load of the flock can be calculated, at block 136, this value providing an indication of the amount of moisture and sensible heat being given off by the birds. Thereafter, at block 138, the ventilation rates for humidity (VH) and temperature (VT) control are both calculated on the basis of the heat and moisture loads. If the sensible heat load is such that it is not possible to obtain the desired inside temperature, even if all of the ventilating fans were operated, a warning alarm is provided and maximum ventilation is employed.

At block 140, a determination is made as to whether the ventilation rate VH for obtaining the desired humidity level is greater than the ventilation rate VT required to obtain the desired temperature level. If this is the case, then it will be necessary to provide supplemental heat from the heaters, in order to maintain the desired temperature level in the poultry house and a computation is made at block 142 of the amount of supplemental heat required. Thereafter, at block 144, a further computation is made of the weight gain, feed use, fuel use, electricity use, and other flock parameters required for determining the operation of the poultry house, at an operator selected temperature. Upon completion of these calculations, the grow out loop of FIG. 6 is complete, and the system returns to the program of FIG. 6, block 104, which again determines whether the current age of the flock is less than or equal to 21 days. If it is still less, then the grow loop of FIG. 9 and the grow out loop of FIG. 8 are repeated until 21 days have lapsed. Thereafter, the program proceeds to block 146 where a determination is made as to whether the grow out of the flock has been completed. This normally requires between 45 and 55 days, depending on the desired market weight and on the house temperatures over that period. If it has not finished, then the program proceeds to block 148, where calculations are made to optimize the operation of the system so as to find conditions that will maximize the economic return. After the birds are 21 days old, the temperature control dial is set at the "optimize" setting, rather than at an operator selected temperature value.

The program loop of FIG. 7 is used to obtain optimal inside conditions during the balance of the grow out period after the first 21 days. This is done through a repetitive simulation at each control interval of house and flock performance over an acceptable range of temperatures which is established by the operator; for example, 50° F. to 80° F. The simulations are based on the current target relative humidity established by dial 92. The program selects from the simulations the optimal inside temperature, according to Eq. 1, as above, and then activates the heating and ventilating equipment needed to achieve the optimal temperature during the next following control interval. To accomplish this, the program first determines the minimum allowed (or feasible) inside temperature ti (e.g. 50° F.) for the poultry house, which is established by the data initially entered into the control system. The program then proceeds to block 152, where the grow out loop of FIG. 8 is followed, as explained above, to provide computations for the ventilation rates required for humidity and temperature control at the initial value of ti. The program then determines whether the equipment is capable of maintaining the house at this minimum initial temperature, and if not, determines the lowest minimum temperature achievable (block 154) by the equipment. This becomes the lowest feasible temperature, and is stored, with the resulting ventilation rates, flock growth rates, feed consumption and operating costs, at block 156. The temperature ti is then incremented up by 1° F., as indicated at block 158. If the incremented interior temperature ti is less than the predetermined maximum allowed temperature for the poultry house (e.g. 80° F.), the calculations from the grow out loop of FIG. 8 are redone at block 152, and the cycle is repeated. This is done through the entire permissible range of temperatures, and all the ventilation conditions that are feasible are stored with their resulting growth rates, feed consumption and operating costs (all predicted values). At the completion of this simulation for the entire temperature range, the program goes to block 162, where the single set of conditions which produces a maximum economic return is selected (see Eq. 1) and the corresponding ventilation and heating rates are established for the next control interval.

Based on the selected optimal temperature and associated conditions, a new running average relative humidity is computed, as affected by the actual RH which will occur during the next control interval, and which may be at or below the control interval target RH. This new running value is then used to determine an appropriate RH control interval target for future control interval calculations.

Upon completion of the foregoing calculations, the program loop of FIG. 7 terminates, and the system goes to block 164 in FIG. 6, which maintains the newly calculated conditions and collects data from the various sensors for the next cycle. This collection of data is carried out in accordance with the grow loop of FIG. 9, discussed above. The monitoring of the inside and outside temperature and comparison of measured temperature with calculated temperature, in accordance with FIG. 9, is repeated at preselected time intervals, and at each interval the operation of the system is optimized for conditions that will maximize the economic return from the poultry house. This continues until the grow out period for the flock is complete, at which time the program of FIG. 6 goes to block 166, causing the system to compute the results of the grow out period, and thereafter the program terminates.

In accordance with the foregoing program, it is not necessary to actively monitor the various fans and heaters, the conditions within the poultry house being determined indirectly by measuring the actual interior temperature and comparing it with the calculated temperature under the fan and heater conditions established by the controller. If the interior temperature does not meet control system predictions, then it will be apparent to the operator that there may be something wrong with one or more fans or heaters.

The humidity level established by dial 92 affects the calculation of the ventilation rate required for moisture control of the litter, even though the humidity during any control interval may be greatly different from the selected 24-hour target value. Both relative humidity and temperature directly affect litter condition, either to cause it to become more moist, or to cause it to dry out. The control system constantly calculates the actual 24-hour average relative humidity and then uses ventilation rates which will maintain the 24-hour average at a value established by the house manager on the basis of his qualitative assessment of the condition of the litter, thereby allowing the operator to have a direct input to the operation of the poultry house and to enable the system to function in a much more effective way to protect the health of the poultry. The ventilation rate which is established for purposes of humidity control will dominate the operation of the system until the ventilation rate required for actual temperature control is larger. Thus, the method of the present invention provides a safer and healthier environment for the poultry house, than was possible with prior systems which operated from set temperature points and used fixed minimum ventilation rates for moisture control.

Although the present invention has been set forth in terms of preferred embodiments, it will be apparent to those of skill in the art that variations and modifications may be made without departing from the true spirit and scope thereof as set forth in the following claims:

What is claimed is:

1. A method of controlling environmental conditions in an animal enclosure having litter material on the floor thereof, to provide a maximum economic return from the growth of animals housed therein, said enclosure including a plurality of controllable ventilation fans and a plurality of controllable heaters, comprising:

determining the static parameters of the animal enclosure including size and thermal characteristics;

determining the number and type of animals to be housed in said enclosure;

determining current values of variable parameters, including current weight, heat production, air infiltration, prices of fuel, feed, electricity, and market value of animals;

assessing qualitatively the relative moisture content of the animal enclosure litter to determine whether the litter is too dry or too wet;

establishing a target relative humidity value in response to said qualitative assessment;

measuring the exterior air temperature near said enclosure to establish a dew point temperature;

measuring the interior air temperature within said enclosure;

determining, from said measured exterior temperature, dew point temperature, and target humidity, for each of a plurality of feasible interior temperatures, the ventilation rate VT required to maintain that feasible interior temperature, the ventilation rate VH required to maintain air relative humidity at a control interval value which will achieve a 24-hour average relative humidity at said target value; the expected animal growth feed consumption and operating costs at that temperature; and selecting and maintaining the one of said feasible interior temperatures which will produce the maximum economic return for the animals in said enclosure.

2. The method of claim 1, further including operating enclosure ventilating fans and heaters in accordance with the values determined for the selected interior temperature, said system operating to select the rate VH whenever VH is equal to or greater than VT, and selecting the rate VT whenever VT exceeds VH.

3. The method of claim 2, further including the step of activating a sufficient number of ventilating fans in said enclosure to attain the selected ventilation rate.

4. The method of claim 3, further including activating said ventilating fans in sequence.

5. The method of claim 2, further including the step of activating a sufficient number of heaters to maintain the interior temperature of said enclosure when VH exceeds VT.

6. The method of claim 2, further including the step of determining a 24-hour average relative humidity value for air inside said enclosure;

periodically comparing said target relative humidity to said 24-hour average relative humidity and determining the difference therebetween; and establishing said ventilation rate VH at a value which will produce a very high relative humidity within said enclosure as long as the current 24-hour running average relative humidity is less than said target relative humidity.

7. The method of claim 2, wherein the steps of determining the ventilation rates VT and VH for feasible temperatures and of selecting one of said ventilation rates are repeated at regular short control intervals.

8. The method of claim 7, wherein the qualitative assessment of the relative moisture content of said litter and the establishment of a target relative humidity value are performed periodically.

9. The method of claim 7, further including determining, from the selected ventilation rate an anticipated interior air temperature;

comparing the anticipated interior air temperature with said measured interior air temperature to obtain a difference temperature;

correcting individual fan delivery rates to reduce said difference temperature; and providing an alarm if said difference temperature exceeds a predetermined value.

*10. A method of controlling environmental conditions in an animal enclosure to provide a maximum economic return from the growth of animals housed therein, said enclosure including at least one controllable ventilation fan and at least one controllable heater, comprising:*

*determining the configuration and thermal characteristics of the animal enclosure;*

*determining the number and type of animals to be housed in said enclosure;*

*determining current values of variable parameters, including current weight, heat production and market value of animals in said enclosure, air infiltration into said enclosure, and prices of fuel, electricity and feed;*

*determining, for each of a plurality of feasible interior temperatures, a ventilation rate VT required to maintain that feasible interior temperature which, when combined with the said enclosure configuration, thermal characteristics and variable parameters, will result in the maximum economic return;*

*selecting and maintaining the one of said feasible interior temperatures which will produce the maximum economic return for animals in said enclosure by operation of at least one of said ventilation device and said heater, to effect the ventilation rate VT, within said enclosure which will result in the maximum economic return.*

*11. The method of claim 10, further including: assessing qualitatively the current conditions of variable parameters including moisture conditions in the enclosure;*

*determining, for each of a plurality of feasible interior relative humidities, a moisture ventilation rate VH required to maintain that feasible interior relative humidity which, when combined with the said enclosure configuration, thermal characteristics and variable parameters, will result in the desired moisture conditions within the enclosure; and*

*selecting and maintaining the one of said feasible interior relative humidities which will produce the desired relative moisture conditions for the animals in said enclosure by operation to at least one of said ventilation device and said heater, to produce the required moisture ventilation rate VH.*

*12. Method of claim 11, further comprising:*

*assessing qualitatively a relative moisture condition of the enclosure floor and any covering material within said animal enclosure, to determine if said floor or covering material is too dry or too wet;*

*establishing a target relative humidity value in response to said qualitative assessment;*

*determining, for said target humidity, for each of a plurality of feasible interior temperatures and for each of a plurality of feasible interior relative humidities, the ventilation rate VT and the moisture ventilation rate VH required to maintain that feasible interior temperature and that feasible interior relative humidity which, when combined with the said enclosure configuration, thermal characteristics and variable parameters, will result in the maximum economic return;*

*selecting and maintaining the one of said feasible interior temperatures and the one of said feasible interior relative humidities which will produce the maximum economic return for the animals in said enclosure by operation of at least one of said ventilation device and said heater, to effect the ventilation rate VT and the moisture ventilation rate VH, within said enclosure which will result in the maximum economic return.*

*13. A method of controlling environmental conditions in an animal enclosure to provide a maximum economic return from the growth of animals housed therein, said*

*enclosure including at least one controllable ventilation device, comprising:*

*determining the configuration and thermal characteristics of the animal enclosure;*

*determining the number and type of animals to be housed in said enclosure;*

*determining current values of variable parameters, including current weight, heat production and market value of animals in said enclosure, air infiltration into said enclosure, and prices of electricity and feed;*

*determining, for each of a plurality of feasible interior temperatures, a ventilation rate VT required to maintain that feasible interior temperature which, when combined with the said enclosure configuration, thermal characteristics and variable parameters, will result in the maximum economic return;*

*selecting and maintaining the one of said feasible interior temperatures which will produce the maximum economic return for animals in said enclosure by selective operation of said ventilation device, to effect the ventilation rate VT within said enclosure which will result in the maximum economic return.*

* * * * *